United States Patent

[11] 3,623,043

[72] Inventor Michael Bozoian
 Ann Arbor, Mich.
[21] Appl. No. 840,651
[22] Filed July 10, 1969
[45] Patented Nov. 23, 1971
[73] Assignee Ford Motor Company
 Dearborn, Mich.

[54] LOW LIQUID LEVEL WARNING SYSTEM
 5 Claims, 1 Drawing Fig.
[52] U.S. Cl. .................................................. 340/181,
 340/248 A, 340/52 R, 340/244 R, 340/59
[51] Int. Cl. ...................................................... B60q 1/00
[50] Field of Search ............................................ 340/181;
 330/19, 20

[56] References Cited
 UNITED STATES PATENTS
 2,762,997 9/1956 Boddy ........................... 340/181
 3,096,487 7/1963 Lee ................................ 330/19
 3,099,802 7/1963 Mattern ........................... 330/19
 3,333,469 8/1967 Godfrey ......................... 340/181
 3,334,339 8/1967 McCauley ...................... 340/181
 3,335,414 8/1967 Meserow ........................ 340/181

*Primary Examiner*—John W. Caldwell
*Assistant Examiner*—Robert J. Mooney
*Attorneys*—John R. Faulkner and Keith L. Zerschling ABSTRACT: A low liquid level warning system particularly suitable to give a warning to a vehicle operator of a low liquid level condition in automotive vehicle liquid containers, for example, in the fuel tank of the automobile. The low liquid level warning system is coupled to a conventional liquid level indicating system that is supplied with pulsating electrical energy having a substantially constant effective voltage value irrespective of the terminal voltage of the charging system of the vehicle and of the source of electrical energy for the vehicle. A solid-state circuit means has an input circuit connected to the liquid-level indicating system and an output circuit connected to the source of electrical energy, i.e., the charging system for the vehicle, and to a pulse-integrating relay. The pulse-integrating relay is normally closed and when in this position energizes a warning indicator or lamp. When the level of the liquid is above a critical low level, pulses of electrical energy are applied to the relay from the solid-state circuit means and these pulses will open the relay thereby extinguishing the warning lamp or other indicating means which has been energized upon initial closing of the ignition switch. When the liquid level falls to a critical low level, for example, one-eighth to one-tenth of the full capacity of a fuel tank, the solid-state circuit means no longer applies pulses to the pulse-integrating relay and the relay closes. As a result, the warning indicator or lamp is energized thereby giving the vehicle operator a warning of a low level condition in a container, particularly, a low level condition in the fuel tank of an automotive vehicle.

PATENTED NOV 23 1971
3,623,043
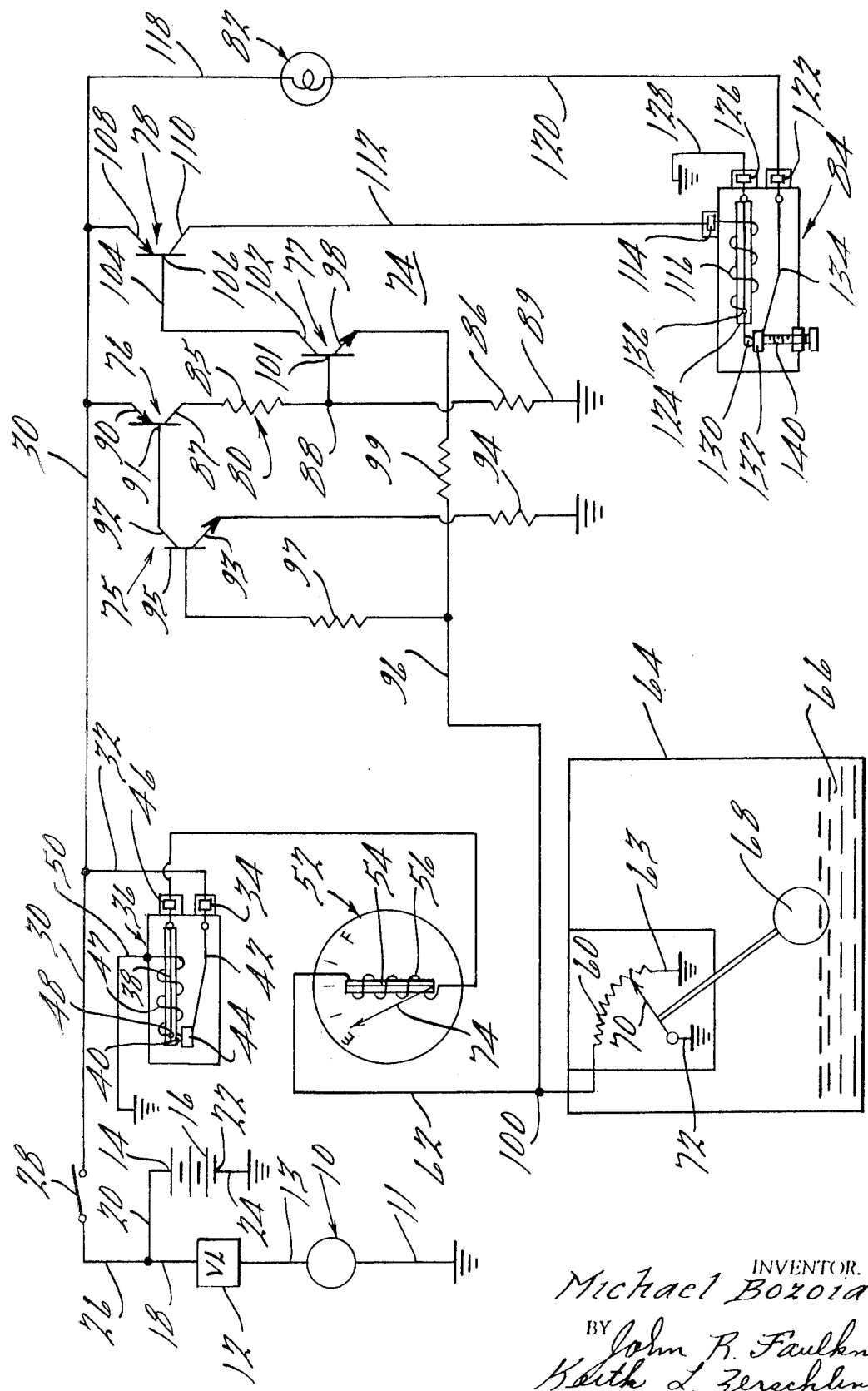
INVENTOR.
Michael Bozoian
BY John R. Faulkner
Keith L. Zerschling
ATTORNEYS

LOW LIQUID LEVEL WARNING SYSTEM

BACKGROUND OF THE INVENTION

Many low liquid level warning systems have been employed to provide a vehicle operator with an indication of a critical low level liquid condition in a container in an automobile vehicle. These systems, however, are complex and often times require a complete separate system for giving such an indication, quite apart from a liquid-level indicating system. In addition, other low liquid level warning systems are known in the prior art which are combined with the electrical circuitry of a liquid-level indicating system, but these systems are often times complex and do not properly give a correct low liquid warning at a cost which is compatible with the high production quantities of automobiles encountered in the automobile manufacturing business.

There is shown in copending application, Ser. No. 772,665 filed Nov. 1, 1968, now abandoned, in the names of Michael Bozoian and Lawrence J. Vanderberg and assigned to the assignee of this invention, a low liquid level warning system that includes a solid-state circuit means having an input circuit coupled to a source of pulsating voltage that produces pulses having an amplitude proportional to the magnitude of the pulses produced by an instrument voltage regulator. The output of the solid-state circuit means is also coupled to the instrument voltage regulator to receive the output pulses of the instrument voltage regulator and to a pulse-integrating relay of the bimetal type. In this system, the current and power used to operate the pulse-integrating relay, which in turn is employed to operate a warning indicator or lamp, comes from the instrument voltage regulator that produces voltage pulses.

Moreover, in this system, a wire or electrical connection must be made not only to the instrument voltage regulator but also to a point positioned intermediate a liquid-level indicating gauge and a variable resistor or impedance that senses liquid level and is coupled in series with the gauge and the instrument voltage regulator. While this system has attained its objectives in a simple and economical way, the two-wire connection to the gauge system and the instrument voltage regulator introduces a cost problem in those instances when the low liquid level warning system is supplied as a customer option.

In many instances, when the low level warning system is to be supplied as a customer option, only one wire is readily available in the gauge system and the instrument voltage regulator for connection to the solid-state circuit means. This is particularly true in vehicles which employ a flexible printed circuit for the wiring in the instrument panel.

The present invention provides a low level liquid warning system that utilizes only one wire as a connection to the gauge system and the instrument voltage regulator. Hence, the solid-state circuit means may be positioned in any convenient location in the vehicle, and the system as a whole may be readily and conveniently employed as a customer option.

SUMMARY OF THE INVENTION

The present invention relates to a low liquid level warning system particularly adapted to provide a low-fuel warning indication in an automotive vehicle. It is suitable for use with a liquid-level indicating system of the bimetal type in which an instrument voltage regulator produces a pulsating output having a substantially constant effective voltage value irrespective of the terminal voltage of the vehicle battery charging system. The output from this instrument voltage regulator is applied to a variable impedance means that senses the liquid level in a container, particularly a fuel tank. The variation in the value of the parameter of the variable impedance means is then used to operate a liquid-level indicating device or gauge which may be of the bimetal type.

The present invention utilizes a solid-state circuit or switching means having an input circuit that is connected through a single wire to a position intermediate the bimetal-type liquid-level gauge and the variable impedance that operates this gauge. As a result, this single wire receives pulses of electrical energy having an amplitude which is an inverse function of the liquid level in the container. The output circuit of this solid-state circuit or switching means is connected to the vehicle electrical system including the electrical storage battery and the battery charging system for the vehicle. The output circuit is also coupled to a pulse-integrating relay of the bimetal type which utilizes the same components as the instrument voltage regulator. A warning indicator or lamp is coupled to the electrical storage battery of the vehicle and the vehicle charging system and also to the pulse-integrating relay. This warning indicator or lamp will give a warning when the contacts of the relay are closed.

In operation, if the level of the liquid in a container, for example, fuel in a fuel tank of an automotive vehicle, is above a certain critical level, the indicating means or warning lamp will be energized when the ignition switch of the vehicle is initially closed thereby providing a prove-out for the low liquid level warning system. The solid-state circuit or switching means will apply pulses to the pulse-integrating relay and after a given number of pulses are applied, the relay will open and the warning indicator or lamp will be extinguished or deenergized. The pulses are derived from the solid-state circuit or switching means under the control of the pulses applied to the single wire connected intermediate the bimetal liquid-indicating gauge and the variable impedance means positioned in the container whose liquid level is to be measured. It should be noted that the current or power applied to the pulse-integrating relay comes from the vehicle electrical system directly and not from the instrument voltage regulator.

If during operation of the vehicle, the level of the liquid in the container, for example, the level of the fuel in the fuel tank, falls below a given predetermined or critical level, the solid-state circuit or switching means will no longer generate pulses to be applied to the pulse-integrating relay. When this occurs, sufficient energy is no longer applied to the pulse-integrating relay to maintain the relay contacts in an open position. As a result, the contacts close and the warning lamp or other indicating means is energized thereby giving the vehicle operator a warning that the liquid contained in the container or fuel tank has reached the predetermined or critical low level.

It can be appreciated, in addition, that if the liquid in the container or fuel tank is at or below the predetermined critical low level when the ignition switch is initially energized, the warning indicating means or lamp will remain energized since the pulse-integrating relay will not receive sufficient energy to open the contacts of the relay.

The above-described structure is particularly useful with a liquid-level indicating system of the bimetal type in which an instrument voltage regulator that produces output pulses having a substantially constant effective voltage value is employed with a bimetal gauge connected to a variable impedance or resistor operated by a float in the container or fuel tank. A single connection made to this system, preferably intermediate the bimetal gauge and the variable impedance or resistor, is employed to operate the solid-state circuit or switching means of the present invention which is effective to produce or generate pulses of electrical energy applied to a pulse-integrating relay. Moreover, the power supplied to the pulse-integrating relay through the solid-state circuit or switching means, in the form of generated pulses, is supplied from the vehicle electrical system and not from the gauge system or the instrument voltage regulator. This provides the advantage that the output power supplied to the pulse-integrating relay does not need to be switched by the instrument voltage regulator thereby resulting in an increase in the useful life of the voltage regulator. MOreover, with only a single connection made to the gauge system of the vehicle, the low level liquid warning system of the vehicle may easily be supplied to a customer as an add-on option and the solid-state circuit or switching means may be mounted anywhere in the vehicle that is convenient. The single wire that is employed is normally the lead or wire that comes from the variable resistor or impedance means positioned in the container or fuel tank and this lead is readily available for connection in the area of the instrument panel of the vehicle.

An addition desirable advantage of the low liquid level warning system of the present invention is that all of the active components of the solid-state switching or circuit means are switched between fully conduction states and fully nonconducting states by the pulses received from the single wire. This prevents excessive energy dissipation in these active solid-state components and increases their useful life.

BRIEF DESCRIPTION OF THE DRAWING

The single FIGURE of the drawing is a circuit diagram of the low liquid level warning system of the present invention.

DESCRIPTION OF THE PREFERRED EMBODIMENT

Referring now to the single FIGURE of the drawing, there is shown an electrical generator 10 of an automotive vehicle having one terminal thereof connected to ground through lead 11 and another terminal thereof connected to the automobile vehicle voltage limiter 12 through lead 13. The voltage limiter 12 is connected to the positive terminal 14 of electrical storage battery 16 through leads 18 and 20. The other terminal 22 of the electrical storage battery 16 is connected to ground through lead 24. The output from the voltage limiter 12 and the positive terminal 14 of the battery 16 is connected through lead 26, ignition switch 28, lead 30 and lead 32 to input terminal 34 of an instrument voltage regulator 36 of the bimetal type.

The instrument voltage regulator 36 for the instrument system of the vehicle with which the present invention may be used is of conventional construction and it includes a bimetal blade 38 having a contact 40 positioned at one end thereof. Another metallic blade 42 having contact 44 normally positioned in contact with contact 40 is connected to input terminal 34 and the bimetal blade 38 is connected to output terminal 46 of the voltage regulator 36. A heater winding 47 for bimetal blade 38 is connected electrically at one end to bimetal blade 38 as shown at 48 and at the other end to ground through lead 50. As is normal in this type of voltage regulator, the heat supplied by the winding 47 as a result of its energization through lead 30, lead 32, terminal 34, metallic blade 42, contact 44, contact 40 and bimetal blade 38, brings the bimetal blade 38 to a position to cause incipient opening and closing of contacts 40 and 44. The voltage regulator 36, therefore, produces output pulses at the terminal 46 which have a substantially constant effective voltage valve with respect to time irrespective of the voltage appearing on the lead 30 from the voltage limiter 12 and the source of electrical energy or storage battery 16.

Liquid-level indicating device 52, for example, a gasoline gauge, is a conventional bimetal thermally operated gauge, and it includes a bimetal actuator 54 and a heater winding 56. The heater winding has one end thereof connected to output terminal 46 of instrument voltage regulator 36 through a lead 58 and the other end thereof connected to one terminal of a variable impedance means 60 through lead 62. The other terminal of the variable impedance means 60 is connected to ground through lead 63.

The variable impedance means 60 may be a variable resistor positioned within a tank 64 having a liquid 66, for example, gasoline, positioned therein. A float 68 is operatively coupled to movable arm 70 of the variable resistor to vary the position of movable arm 70 in accordance with the level of the liquid in the tank 64. As shown, the arm 70 is pivotally mounted in the tank 64 at one end and the other end thereof is positioned in engagement with variable resistor 60. The movable arm is constructed of conductive material and the end that is pivotally mounted in the tank is connected to ground through lead 72.

When the liquid or fuel level is low, as indicated in the drawing, the impedance of the variable impedance device 60 is high since a large portion of the variable impedance means is positioned in series with lead 62 and the movable arm 70. As the liquid or fuel level rises, the movable arm 70 will move along the arc of the variable impedance means 60 and thus, less of the variable impedance will be connected in series with lead 62 and movable arm 70.

It can be appreciated that the circuit from the lead 62 is completed through that portion of the variable impedance means 60 above the arm 70 through the lead and to ground through lead 72. Thus, when the liquid level in the tank 64 is low, most of the voltage at terminal 46 of instrument voltage regulator 36 will appear across the variable impedance means 60. As a result, the heater winding 56 of the gauge 52 will receive a minimum amount of electrical energy and the pointer 74 thereof will be positioned near the empty mark. When the fuel level in the tank 64 is high, very little of the voltage from the output terminal 46 of the instrument voltage regulator 36 will appear across the variable impedance device 60 and most of it will appear across the winding 56 of the gauge 52. This supplies a large amount of heat to the bimetal actuator 54 and the pointer will read near the full mark on the instrument or gauge 52.

A low liquid or fuel level warning system is connected to the above-described liquid-level indicating system by a very uncomplicated and inexpensive circuit to provide a low liquid or low fuel level warning indication. This system comprises a solid-state circuit means 74 which may comprise a first transistor or solid-state switching device 75, a second transistor or solid-state switching device 76, a third transistor or solid-state switching device 77, a fourth transistor or solid-state switching device 78, a voltage divider 80, a warning indicator 82, for example, a lamp, and a pulse-integrating relay 84.

The voltage divider 80 may comprise resistors 85 and 86 connected in series, with one terminal of the resistor 85 connected to the collector 87 of second solid-state switching device or transistor 76. The other terminal of resistor 85 and one terminal of resistor 86 are connected at a junction 88, and the other terminal of the resistor 86 is connected to ground through a lead 89.

The emitter 90 of the second solid-state switching device or transistor 76 is connected to the line 30, while the base 91 thereof is connected to collector 92 of the first solid-state switching device or transistor 75. The emitter 93 of the first solid-state switching device or transistor 75 is connected to ground through a resistor 94, while the base 95 thereof is connected to a line 96 through a resistor 97.

The emitter 98 of the third solid-state switching device or transistor 77 is connected through resistor 99 to line 96, which in turn is connected to a junction 100 positioned in lead 62 and between the variable impedance means or resistor 60 and heater winding 56 of gauge 54. The base 101 of the third solid-state switching device or transistor 77 is connected to the junction 88 positioned between resistors 85 and 86 that comprise voltage divider 80, while the collector 102 thereof is connected through lead 104 to the base 106 of the fourth solid-state switching device or transistor 78. The emitter 108 of the fourth solid-state switching device or transistor 78 is connected to the line 30, while the collector 110 thereof is connected through lead 112 to one terminal 114 of heater winding 116 of the pulse-integrating relay 84.

One terminal of the warning indicator or lamp 82 is connected to lead 30 through lead 118. The other terminal of the warning indicator or lamp 82 is connected through lead 120 to terminal 122 of pulse-integrating relay 84.

As shown in the drawing, the pulse-integrating relay 84 has the same structural components as the instrument voltage regulator 36 including heater winding 116 and bimetal blade 124 which is connected at one end to terminal 126 that is grounded through lead 128. The other end of bimetal blade 124 carries contact 130. This contact is normally in engagement with contact 132 positioned on metal or conductive blade 134, which in turn is connected to terminal 122 and the warning lamp or indicator means 82. The end of the heater winding 116 opposite the terminal 114 is connected at 136 to the bimetal blade 124 and is, therefore, connected to ground through the bimetal blade 124, terminal 126 and lead 128. An adjusting screw 140 is employed to bias the blade 134 and hence contact 132 into engagement with contact 130. The amount of force applied to the blade 134 and contact 132 may be varied by turning the adjusting screw 140.

In normal operation, when the level of the liquid 66, which may be the level of gasoline positioned in the tank 64, is above a critical level, for example, one-eighth or one-tenth of the liquid-holding capacity of the tank 64, a pulsating voltage will appear at the junction 100. This pulsating voltage has a positive instantaneous magnitude which is an inverse function of the level of the liquid in the container or tank 64. This positive instantaneous magnitude will increase as the liquid level in the container or tank 64 falls since an increasing portion of the variable impedance means or resistor 60 will be positioned in series with the heater winding 56 of the liquid level indicating gauge 52. These positive pulses are applied to the line 96 and hence to the base 95 of the first transistor or solid-state switching device 75. Each positive pulse, therefore, will switch the first transistor or solid-state switching device to a conducting state thereby permitting current to flow out of base 91 of the second transistor or solid-state switching device 76 and to ground through the collector 9—emitter 93 circuit and resistor 94. This switches the second transistor or solid-state switching device 76 to a conducting state. As a result, current will flow from line 30, which is connected to the vehicle electrical system including the electrical storage battery 16 and the output of the voltage limiter 12, through emitter 90, collector 87, resistors 85 and 86 of the voltage divider 80 to ground through lead 89.

The action described above applies a positive voltage at the base 101 of the third transistor or solid-state switching device 77 via junction 88 positioned between resistors 85 and 86 and this pulse, when the liquid level is above the predetermined or critical level, will switch the third transistor or solid-state switching device 77 to a conducting state since the emitter 98 is connected to the junction 100 via resistor 99 and lead 96. The values of the resistors 85 and 86 are selected so that the voltage appearing at the junction 88, when the second transistor or solid-state switching device 76 is switched to a conducting state, is sufficiently above the voltage appearing on line 96 and junction 100 to bring the third transistor or solid-state switching device 77 to a conducting state, when the liquid level in container 64 is above the predetermined or critical level.

When the third transistor or solid-state switching device 77 is switched to a conducting state, the fourth solid-state switching device or transistor 78 is also switched to a conducting state since current may flow out of base 106 through the collector 102—emitter 98 circuit of the third transistor or solid-state switching device 77. When the fourth transistor or solid-state switching device 78 is switched to a conducting state, a pulse of electrical energy is delivered to the heater winding 116 of the pulse-integrating relay 84 from line 30, which is connected to the vehicle electrical system, i.e., electrical storage battery 16 and voltage limiter 12, through the emitter 108—collector 110 circuit of the fourth transistor or solid-state switching device 78 and lead 112.

It can be appreciated that as a train of pulses is received on line 96 from junction 100, under the above-mentioned conditions, all of the solid-state switching devices or transistors 75 through 78 are switched alternately between conducting and nonconducting states and hence pulses of electrical energy from the line 30 are applied to the heater winding 116 of pulse-integrating relay 84.

When a given amount of electrical energy in the form of pulses is received by the winding 116, the bimetal blade 124 will bend upwardly and will open the contacts 130 and 132 thereby deenergizing the warning indicator or lamp 82. Thus, when ignition switch 28 is closed and the level of the liquid contained in the container or tank 64 is above a certain predetermined or critical level, such as, one-eighth or one-tenth of the liquid-holding capacity of tank 64, indicator or warning lamp 82 will be energized for a short period of time necessary for the pulses supplied via transistor or solid-state switching device 78 to heater winding 116 of pulse-integrating relay 84 to open contacts 130 and 132. When this happens, the warning indicator or lamp 82 will be deenergized. This feature provides a prove-out for the system when the ignition switch 28 is initially closed.

When the liquid or fuel level in the container 64 falls to a certain predetermined or critical low level, the pulsating voltage at junction 100 and applied to line 96 will be raised to a critical level with respect to the pulsating voltage appearing at the junction 88 between resistors 85 and 86 of voltage divider 80 as a result of the second solid-state switching device or transistor 76 being switched between conducting and nonconducting states. It can be appreciated that as the fuel or other liquid in the container 64 drops and the float 68 drops with it, the movable arm 70 will place a greater amount of the variable impedance means or resistor 60 in series circuit with the winding 56 of the fuel gauge 52. The variable impedance means or resistor 60 thereby increases the voltage appearing at the junction 100 and on line 96 as the level of the liquid 66 drops, On the other hand, since the emitter 90 of the second transistor or solid-state switching device 76 is connected to line 30, which in turn is connected to the vehicle electrical system including storage battery 16 and voltage limiter 12, the current through the resistors 85 and 86 will be substantially constant as long as the second transistor or solid-state switching device 76 is driven into a saturated condition. Therefore, the magnitude of the pulsating voltage appearing at the junction 88 and applied to base 101 of the third transistor or solid-state switching device is substantially constant. As the voltage appearing at the junction 100 and on line 96 rises to a value which is slightly below and then equal to the voltage at junction 88, it can be appreciated that the third transistor or solid-state switching device 77 will not be switched into a conducting condition since the pulsating voltage at the emitter 98, which is connected to line 96 through resistor 99, will rise to a value substantially equal to the value of the pulsating voltage applied to base 101 from junction 88.

When the third solid-state switching device or transistor 77 no longer is switched between conducting and nonconducting states, the fourth solid-state switching device or transistor 78 will no longer be switched between conducting and nonconducting states. Consequently, the heater winding 116 of pulse-integrating relay 84 will no longer receive pulsating electrical energy. The bimetal blade 124, therefore, will cool to a point where contact 130 again engages contact 132. At this time, a circuit is completed from the line 30, and the source of electrical energy 16 and voltage limiter 12, through lead 118, the warning indicator or lamp 82, lead 120, terminal 122, blade 134, closed contacts 132 and 130 and to ground through bimetal blade 124, terminal 126 and lead 128 of the pulse-integrating relay 84. As a result, the warning indicator or lamp 82 is energized to thereby indicate a low liquid or fuel level condition to the vehicle operator.

It can be appreciated that the low level liquid warning system may be easily connected to a conventional liquid-level indicating system since only one connection need be made thereto. This connection is at the junction 100 and can be made to the lead or wire coming from the variable impedance means or resistor 60 located in the container or fuel tank 64. This lead or wire is readily available in the instrument panel of an automotive vehicle so that the connection at junction 100 can be made easily. All of the solid-state switching devices or transistors 75 through 78, their associated resistors 85, 86, 94, 97 and 99, and the pulse-integrating relay 84 may be positioned on a printed circuit board. The only connections that need to be made to this board are to the junction 100, to the line 30 and to ground. Since the line 30 may be easily and readily connected to the accessory terminal of ignition switch 28, it can be appreciated that there is no problem in making this connection. Similarly, there is no problem in making the ground connection for the system.

Typical component designations and values are listed below:

| | |
|---|---|
| Transistor 75 | MPS 6515 |
| Transistor 76 | MPS 6534 |
| Transistor 77 | MPS 6515 |
| Transistor 78 | MPS 6534 |
| Resistor 85 | 680 ohms |
| Resistor 86 | 4.7 K ohms |
| Resistor 97 | 4.7 K ohms |
| Resistor 99 | 390 ohms |
| Resistor 94 | 33 K ohms |
| Warning lamp 82 | 1895, 12 v., 2 candle power |

Thus, the present invention provides a very uncomplicated, inexpensive and satisfactory low liquid level or low fuel warning system that may be readily employed with liquid- or fuel-level indicating systems currently used in automotive vehicles. The system is particularly advantageous when it is employed as optional equipment in a regular production vehicle. This is true since only one wire need be connected into the gauge system, and this is done at a location where a lead from the variable impedance means or resistor in a container or fuel tank is readily available. Furthermore, the electrical energy used in the switching of the warning indicator or lamp, i.e., the energy applied to the heater winding of a pulse-integrating relay, comes from the vehicle electrical system itself, i.e., the battery and voltage limiter connected to the generator. This eliminates the need for sending additional power through the pulsating instrument voltage regulator conventionally used in automotive vehicles. In addition, all of the solid-state switching devices or transistors employed in the system are switched between fully conducting and fully nonconducting states, during the majority of the time of operation, thereby preventing large power dissipation in the solid-state switching components and increasing their useful life.

I claim:

1. A low liquid level warning system comprising a source of electrical energy, a warning means pulse-producing means, a pulse-integrating means, a solid-state circuit means, said solid-state circuit means having an input circuit and an output circuit, said output circuit having one terminal coupled to said pulse-integrating means and another terminal adapted to be connected to said source of electrical energy, said warning means being coupled to said pulse-integrating means and adapted to be coupled to the source of electrical energy, the terminals of said input circuit being adapted to be coupled to a junction intermediate a liquid-level indicating gauge and a variable impedance that is an inverse function of liquid level in a container, said liquid-level indicating gauge having one terminal adapted to be connected to said pulse-producing means, said solid-state circuit means including means for producing pulses of electrical energy from the source of electrical energy and for applying the pulses to said pulse-integrating means when the magnitude of the pulses produced by said pulse-producing means at the junction is lower than a preselected fraction of the terminal voltage of the source of electrical energy and for ceasing production of the pulses when the magnitude of the pulses at the junction is substantially equal to or exceeds the preselected fraction of the voltage of said source of electrical energy, said pulse integrating means including means for deenergizing said warning means when said pulse-integrating means receives a predetermined amount of electrical energy from said pulses, said solid-state circuit means comprising a solid-state switching device having a control electrode and a pair of output electrodes, a voltage divider having an intermediate terminal connected to said control electrode, control means coupled to said source of electrical energy and to the junction between said liquid-level indicating gauge and said variable impedance means for coupling said voltage divider across said source of electrical energy when a pulse is present at the junction, one of said output electrodes being connected to said junction, said solid-state switching device being switched to a conducting state when the voltage applying the terminal is greater than the voltage of the junction, and said means for producing pulses of electrical energy from said source of electrical energy and for applying the pulses to said pulse-integrating means comprises means coupled to the other output electrode, the source of electrical energy and the pulse-integrating means for applying a pulse of electrical energy to said pulse-integrating means from said source of electrical energy when said solid-state switching device is switched to a conducting state.

2. The combination of claim 1 in which said control means comprises a solid-state switching device having a control electrode and a pair of output electrodes, said output electrodes connected in series with the source of electrical energy and said voltage divider and means coupling said control electrode to the junction between the variable impedance means and the liquid-level indicating gauge.

3. The combination of claim 2 in which said last mentioned means comprises a solid-state switching device having a control electrode and a pair of output electrodes, said control electrode being connected to one of the output electrodes of said first mentioned solid-state switching device and the output electrodes being coupled to said source of electrical energy and said pulse-integrating means.

4. The combination of claim 1 in which said last mentioned means comprises a solid-state switching device having a control electrode and a pair of output electrodes, said control electrode being connected to one of the output electrodes of said first mentioned solid-state switching device and the output electrodes being coupled to said source of electrical energy and said pulse-integrating means.

5. A low liquid level warning system for an automotive vehicle comprising a source of electrical energy, a container having a liquid positioned therein, means coupled to said source of electrical energy for producing pulses of electrical energy having a magnitude that is an inverse function of the level of the liquid in said container, a liquid-level indicator coupled to said means for indicating the level of the liquid in said container, a pulse-integrating means, a warning means, circuit means coupling said pulse-integrating means, said warning means and said source of electrical energy for energizing said warning means when said pulse-integrating means does not receive a given amount of electrical energy, a solid-state circuit means having an output circuit coupled to said source of electrical energy and said pulse-integrating means, said solid-state circuit means including means having a single lead connection only to said means for producing pulses of electrical energy having a magnitude that is an inverse function of the level of the liquid in said container for causing said output circuit to generate and apply pulses of electrical energy to said pulse-integrating means when the liquid in the container is above a predetermined level and for reducing the amount of electrical energy received by said pulse-integrating means below said given amount when the level of the liquid in said container is equal to or below said predetermined level whereby said warning means is energized when said liquid level is equal to or below said predetermined level, said means included in said solid-state circuit means comprising a first solid-state switching means having an output circuit and a control circuit. A voltage divider having an intermediate terminal, the output circuit of said first solid-state switching device and said voltage divider being connected in series with said source of electrical energy, a second solid-state switching device having an output circuit and a control circuit, the control circuit of both said solid-state switching devices being connected to said single lead connection, and a third solid-state switching device having a control circuit and an output circuit, said control circuit being coupled to the output circuit of said second solid-state switching device and the output circuit being coupled to said source of electrical energy and said pulse-integrating means.

* * * * *